United States Patent

Hamerl

[15] 3,679,243
[45] July 25, 1972

[54] COUPLING ASSEMBLY
[72] Inventor: Arthur John Hamerl, 10125-103 Ave., Grande Prairie, Alberta, Canada
[22] Filed: March 24, 1969
[21] Appl. No.: 809,745

[30] Foreign Application Priority Data
April 9, 1968 Canada....................017,137

[52] U.S. Cl..................287/21, 287/87, 280/511
[51] Int. Cl. ..............................................F16c 11/06
[58] Field of Search...............280/511, 512, 513; 287/21, 287/88, 87, 12

[56] References Cited

UNITED STATES PATENTS

| | | | |
|---|---|---|---|
| 3,061,334 | 10/1962 | Everett et al. | 280/513 |
| 2,168,101 | 8/1939 | Miller | 280/477 |
| 2,385,596 | 9/1945 | Yager et al. | 280/435 |
| 3,123,380 | 3/1964 | Grim et al. | 280/477 UX |
| 113,039 | 3/1871 | Fish | 287/87 |
| 2,078,851 | 4/1937 | Hovey | 280/513 |
| 2,723,866 | 11/1955 | Hollingsworth | 280/512 |

FOREIGN PATENTS OR APPLICATIONS 659,456  10/1951  Great Britain........................280/511

Primary Examiner—Andrew V. Kundrat
Attorney—Smart and Biggar

[57] ABSTRACT

A ball and socket coupling for trailers and the like, the socket being upwardly and forwardly inclined in a body which has a forwardly convergent upwardly angled groove leading from the rear end of the body to the rear edge of the socket to guide the ball thereto, locking means being provided for locking the ball in the socket.

3 Claims, 4 Drawing Figures

PATENTED JUL 25 1972 3,679,243

INVENTOR
ARTHUR J. HAMERL

BY Smart & Biggar
ATTORNEYS.

COUPLING ASSEMBLY

BACKGROUND OF THE INVENTION

This invention relates to coupling assemblies and more particularly to ball and socket type coupling assemblies adapted for use in coupling trailers or agricultural implements or the like to each other or to a towing vehicle such as, for example, a tractor.

In known ball and socket coupling assemblies, the ball must be precisely positioned in relation to the socket before the two can be successfully coupled together. This involves careful maneuvering of the two vehicles involved and is often both difficult and time consuming. In many cases, the vehicle or implement to be towed has substantial weight focussed at the point at which the ball or socket, as the case may be, is secured, and as the weight increases, the difficulty in achieving the proper alignment of the ball and socket is magnified. Where only one person is available to couple the vehicles together, as would be likely to be the case in the coupling and uncoupling of agricultural implements in the outlying fields of a farm, the coupling of heavy implements might be almost impossible. The same difficulties might be faced by someone attempting to couple and uncouple a heavy trailer from a truck or automobile. With only one person available it would first be necessary to block up the trailer in some way to attain the proper vertical position and then to maneuver the towing vehicle into the proper horizontal position before the two vehicles could be coupled. A coupling operation under these circumstances is difficult and takes a comparatively long time.

Although the problem of uncoupling is not as great as that of attempting to couple vehicles together, there is substantial difficulty where heavy trailers are involved since it will be necessary to lift the trailer tongue clear of the towing vehicle.

Once the vehicles have been coupled together, the ball must be provided with means to prevent it from coming out of the socket while the vehicles are under way. Ball and socket coupling assemblies presently in use have been known to become disengaged through excessive vibration resulting from travel over rough surfaces.

SUMMARY OF THE INVENTION

It is an object of the present invention to facilitate the coupling and uncoupling of trailers or agricultural implements or the like to or from each other or a towing vehicle.

The disadvantages of the known ball and socket type coupling assemblies have been mitigated by the provision of a coupling assembly comprising, a downwardly extending ball, a body having an upwardly and forwardly inclined opening formed therein adapted to receive said ball, said body having a sloping longitudinally extending runway formed in the rear portion thereof adapted to facilitate vertical and horizontal alignment of said ball with the mouth of said opening during coupling of said ball and said opening and means associated with said body adapted to prevent unintentional disengagement of said ball and said opening.

BRIEF DESCRIPTION OF DRAWINGS

In the accompanying drawings which illustrate an embodiment of the invention.

DETAILED DESCRIPTION OF PREFERRED EMBODIMENT

Figure 1:
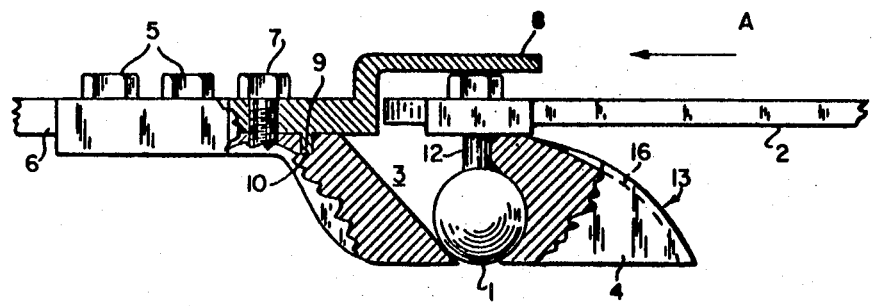
FIG. 1 is a side elevational view, partly in section, of a coupling assembly according to the present invention, FIGS. 2, 3 and 4 together represent an exploded perspective view of a coupling assembly according to the present invention.
Figure 2:
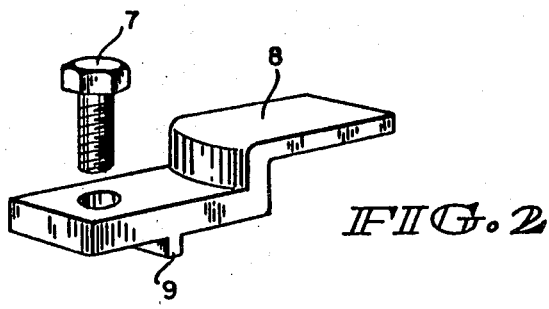
FIG. 2 shows means for preventing unintentional disengagement of the ball shown in FIG. 3 from the body portion of the coupling assembly shown in FIG. 4.
Figure 3:
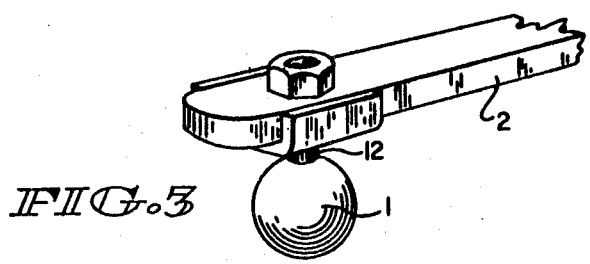

In FIG. 1, a ball 1 is connected to and extends downwardly from an appropriate piece or extension 2 of a trailer or agricultural implement or the like (not shown) (see also FIG. 3). The ball 1 is received by and seated in an opening 3 formed in a body 4 which is attached in a known manner to another trailer, agricultural implement or the like or to a towing vehicle. Bolts 5 in this embodiment secure a forward extension of the body 4 to an extension 6 of another trailer or a towing vehicle (see also FIG. 4). Removably fixed to the body 4 by bolt 7 is a plate 8 extending rearwardly over the opening 3. The plate 8 is adapted to prevent the unintentional disengagement of the ball 1 from the opening 3. In order to ensure that the plate 8 remains over the opening 3 at all times, a ridge 9 is formed on the bottom of the plate 8 and fits in a corresponding slot 10 in the body 4.

The opening 3 in the body 4 is inclined upwardly and forwardly so that the rear edge indicated at 11 of the mouth of the opening 3 wedges between the ball 1 and the extension piece 2 when a pulling force is exerted in the direction of arrow A indicating the intended direction of travel. In the embodiment shown, the ball 1 depends from a post 12 and in order to improve the seating of the ball in the opening in this embodiment an arcuate portion 11a conforming to the shape of the post 12 is cut out of the rear edge 11 of the mouth of the opening 3. This permits the ball 1 to sit deeper in the opening 3, thus lending a more reliable engagement between the two vehicles.

Figure 4:
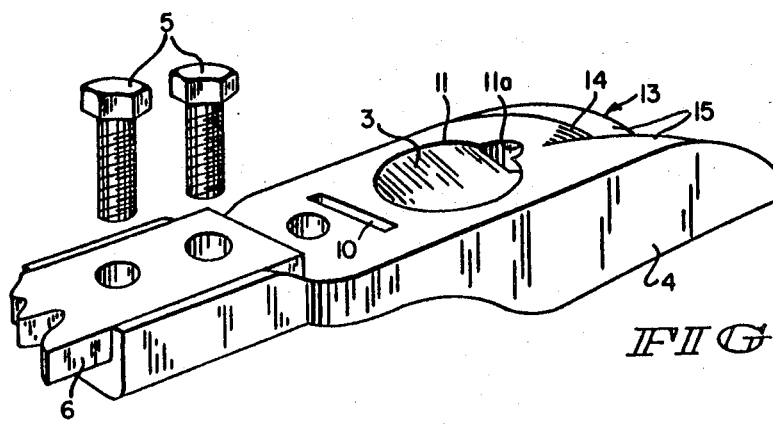

The rear portion of the body 4, best illustrated in FIG. 4, is provided with a sloping, longitudinally extending runway which is indicated at 13. In the embodiment shown, the runway extends from the rear edge 11 of the mouth of the opening 3 to the trailing edge of the body when viewed in the intended direction of travel. The runway is comprised by a centrally disposed groove 14 having gently sloping sides 15. The depth of the groove 14 is indicated by the solid and broken line 16 in FIG. 1.

To couple a trailer or agricultural implement or the like to a towing vehicle, the ball 1 and opening 3 must be brought together so that the ball drops into the opening from above. In the present invention, the vertical and horizontal aligning of the ball in relation to the opening is facilitated by the shape of the rear portion of the body 4. Once the ball is in approximately the right vertical and horizontal position relative to the opening 3, the runway 13 will contact the ball and will tend to center it with respect to the opening and thereafter the ball and opening will continue to move together until the ball falls into the opening. Horizontal alignment is facilitated by the sloping sides 15 and vertical alignment is achieved by the slope of the longitudinal groove 14. Once the ball is seated in the opening 3, the plate 8 is secured in place and thereafter prevents unintentional uncoupling of the ball and the opening.

When the vehicles are to be uncoupled, the plate 8 is removed and the body 4 is moved in the opposite direction to that indicated by arrow A in FIG. 1. Since the opening 3 is upwardly and forwardly inclined, the ball 1 tends to slide up the incline and come out of the mouth of the opening 3 thereby becoming disengaged from the body.

The plate 8, when secured to the body 4, overlies the opening 3 and the ball 1 sufficiently closely to permit travel in the direction opposite to that indicated by the arrow A in FIG. 1 without the vehicles uncoupling.

What I claim as my invention is:

1. A coupling assembly comprising, a downwardly extending ball, a body having an upwardly and forwardly inclined through opening formed therein adapted to receive said ball, said opening having an arcuate cut-out portion in the rear edge of its mouth to accommodate a ball support post and thus permit the ball to seat deeper in said opening, said body having a sloping, longitudinally extending runway formed on the rear portion thereof extending to the mouth of said opening and adapted to facilitate vertical and horizontal alignment of said ball with the mouth of said opening during coupling of said ball with said body and means associated with said body adapted to prevent unintentional disengagement of said ball from said body.

2. A coupling assembly according to claim 1, wherein said runway is comprised by a groove having sloping sides and running from the mouth of said opening to the rear edge of said body.

3. A coupling assembly according to claim 1 wherein said means associated with said body adapted to prevent unintentional disengagement of said ball is a plate removably fixed to said body and overlying said ball when said ball is in said opening.

* * * * *